US006065317A

United States Patent [19]

Steingroever

[11] Patent Number: 6,065,317

[45] Date of Patent: May 23, 2000

[54] APPARATUS AND PROCEDURE FOR MANUFACTURING METALLIC HOLLOW BODIES WITH STRUCTURAL BULGES

[75] Inventor: Erich Steingroever, Bonn, Germany

[73] Assignee: Magnet-Physik Dr. Steingroever GmbH, Germany

[21] Appl. No.: 09/129,214

[22] Filed: Aug. 5, 1998

Related U.S. Application Data

[63] Continuation-in-part of application No. 09/057,607, Apr. 9, 1998.

[30] Foreign Application Priority Data

Apr. 12, 1997 [DE] Germany ........................... 198 15 351
Apr. 4, 1998 [DE] Germany ........................... 198 15 244

[51] Int. Cl.$^7$ ........................... B21D 26/14; B60K 17/22

[52] U.S. Cl. .................................... 72/56; 72/54; 72/430; 29/419.2

[58] Field of Search ............................... 29/419.2; 72/54, 72/56, 430

[56] References Cited

U.S. PATENT DOCUMENTS

| | | | |
|---|---|---|---|
| 3,126,937 | 3/1964 | Brower et al. | 72/56 |
| 3,321,946 | 5/1967 | Ferguson | 72/56 |
| 3,345,732 | 10/1967 | Brower | 72/56 |
| 3,590,464 | 7/1971 | Wildi et al. | 29/419.2 |
| 4,523,872 | 6/1985 | Arena et al. | 29/419.2 |
| 4,619,127 | 10/1986 | Sano et al. | 72/56 |
| 4,702,543 | 10/1987 | Hager | 29/419.2 |
| 4,807,351 | 2/1989 | Berg et al. | 29/419.2 |
| 5,331,832 | 7/1994 | Cherian et al. | 72/56 |
| 5,353,617 | 10/1994 | Cherian et al. | 72/56 |
| 5,457,977 | 10/1995 | Wilson | 72/56 |
| 5,586,460 | 12/1996 | Steingroever | 72/56 |
| 5,684,341 | 11/1997 | Steingroever . | |
| 5,813,264 | 9/1998 | Steingroever | 72/56 |

FOREIGN PATENT DOCUMENTS

| | | | |
|---|---|---|---|
| 2613790 | 10/1988 | France | 29/419.2 |
| 44 23 992 | 7/1994 | Germany . | |

*Primary Examiner*—David Jones
*Attorney, Agent, or Firm*—Harold Gell

[57] ABSTRACT

As procedure for joining two concentrically engaging hollow bodies such as metallic tubes by electromagnetically deforming overlapping surfaces of the hollow bodies to create mutual structural bulges over their common scope in a circumferential and axial direction.

20 Claims, 2 Drawing Sheets

APPARATUS AND PROCEDURE FOR MANUFACTURING METALLIC HOLLOW BODIES WITH STRUCTURAL BULGES

RELATED PATENT APPLICATIONS

This application is a continuation in part of U.S. patent application No. 09/057,607 filed Apr. 9, 1998 for "Process and Apparatus for Manufacturing Hollow Bodies with Structural Bulges".

FIELD OF THE INVENTION

This invention relates to a process for manufacturing metallic hollow body couplings with structural bulges produced by electromagnetic forming accomplished with a high-current loop which is also a magnetic flux field concentrator.

BACKGROUND OF THE INVENTION

The manufacture of tubing combinations for hydraulic fluids, such as required in building brake fluid systems for vehicles and for the fabrication of similar apparatus often requires especially difficult preparations for perfect, compact and permanent combinations, this necessitates a high manufacturing and installation expense.

This matters particularly for soldering and also for tubing combinations fabricated by means of magnetic reshaping techniques if the telescopic parts to be joined with each other are smoothly tapering tubes. For a reliably secure and tight combination, the telescopic parts must have smoothly meshing tubes that not only have a comparatively large wall thickness to avoid tearing due to combined vibrations and mechanical burdens; the meshing tubes must also have a sufficient axial overlapping to avoid such a fate due to the combined axial strain and pressure demands.

OBJECTIVES OF THE INVENTION

The invention provides for the combination of hollow bodies or tubes by means of a magnetic shaping technique with the underlying primary purpose of providing material savings and a more sure way to fashion more lasting assemblies than has previously been possible.

The solution to the task springs from the process disclosed in U.S. patent application No. 09/057,607 in a surprising and simple way, whereby two concentric meshing hollow bodies are firmly joined with one another through several structural bulges distributed over their surfaces both circularly as well as axially to girdle the scope of the meshing surfaces.

An especially advantageous teaching of this process employs a high-current loop which is also a magnetic flux field concentrator.

A primary purpose of the invention is to provide a suitable processes for manufacturing combinations of hollow bodies or tubes by means of magnetic deformation techniques which have the particular advantage that such structural bulges in the connecting area of two concentric meshing hollow bodies may be produced by a unique manufacturing process incorporating an entirely automatic sequence.

SUMMARY OF THE INVENTION

The structural bulges distributed over the extent of the concentric intermeshing ends of the hollow bodies form a firm and absolutely tight cross connection between the engaging surfaces. The union is firm with respect to torsional stresses as well as axial pressure or strain because the pressure affects the connection with a distortion process from all sides evenly. With a structural bulge attachment formed by means of mechanical stamping, the tube finish between the bumps would be uneven and a source of leakage, while with appropriate use of the present invention, the surfaces of the tubes are solidly pressed together, especially at the crests of the structural bulges, so that they are secured one to the other in all directions and a lasting connection is generated. The structural bulges create a firm and lasting connection. The peripheral edges of the structural bulges are also significant. Encountered strain, pressure and torsional stresses are thereby transferred directly into the surrounding walls, which through the solid angular reciprocal interaction at the structural bulges and through the full support of the walls in the transition areas between the structural bulges, a high distortion free solidity is reached, that is essentially higher than achieved with smoothly telescoped tube ends. The double-walled connection area has the distinction, moreover, of an elevated form stiffness and an improved seal at the connection as a consequence.

It is advantageous to the procedure of telescopically joining hollow bodies or tubes together if at least the outer body is fabricated from an electrically good conducting material, such as Cu, Al or steel alloy.

If the prerequisites for the material for the hollow bodies or tubes to be connected are not met, it is possible to proceed according to another advantageous embodiment of the invention wherein a driver ring fabricated from an electrically good conducting material, such as Cu, Al or steel alloy is installed, for the distortion process, on the outer hollow body or tube.

The driver ring can remain on the joint after the distortion according to the material nature of the hollow bodies or tubes to be connected or it can be removed.

If the driver ring is not required on the tube connection, it can be expanded around the connection by reversing the distortion process by rerouting the magnetic impulse with a circuit as described in German Patent DE 196 02 951 and removed from the hollow body or tube connection.

In an especially profitably form of the invention, the magnetic impulses are generated by a flow of current from a condenser discharge through an impulse transformer as in U.S. Pat. No. 5,684,341 and a field concentrator as in U.S. Pat. No. 5,586,460 with a circuit as in U.S. Pat. No. 5,813,364.

It is also especially advantageous however, if the magnetic impulse is generated with a field concentrator arranged as a field coil.

An especially advantageous appliance using a high-current loop and a field concentrator to accomplish the appropriate procedures of invention uses a support core with a round cross section and one or more throats or grooves in the longitudinal direction arranged in the opening of the field concentrator to shape the meshing tube surfaces. The throats or grooves have a conical profile to facilitate extraction of the support core from the hollow body or tube connection.

DESCRIPTION OF THE DRAWINGS

Preferred embodiments for practicing the appropriate procedures of the invention are represented schematically in the drawing which show.

DETAILED DESCRIPTION OF A PREFERRED EMBODIMENT OF THE INVENTION

Figures 1, 1A:
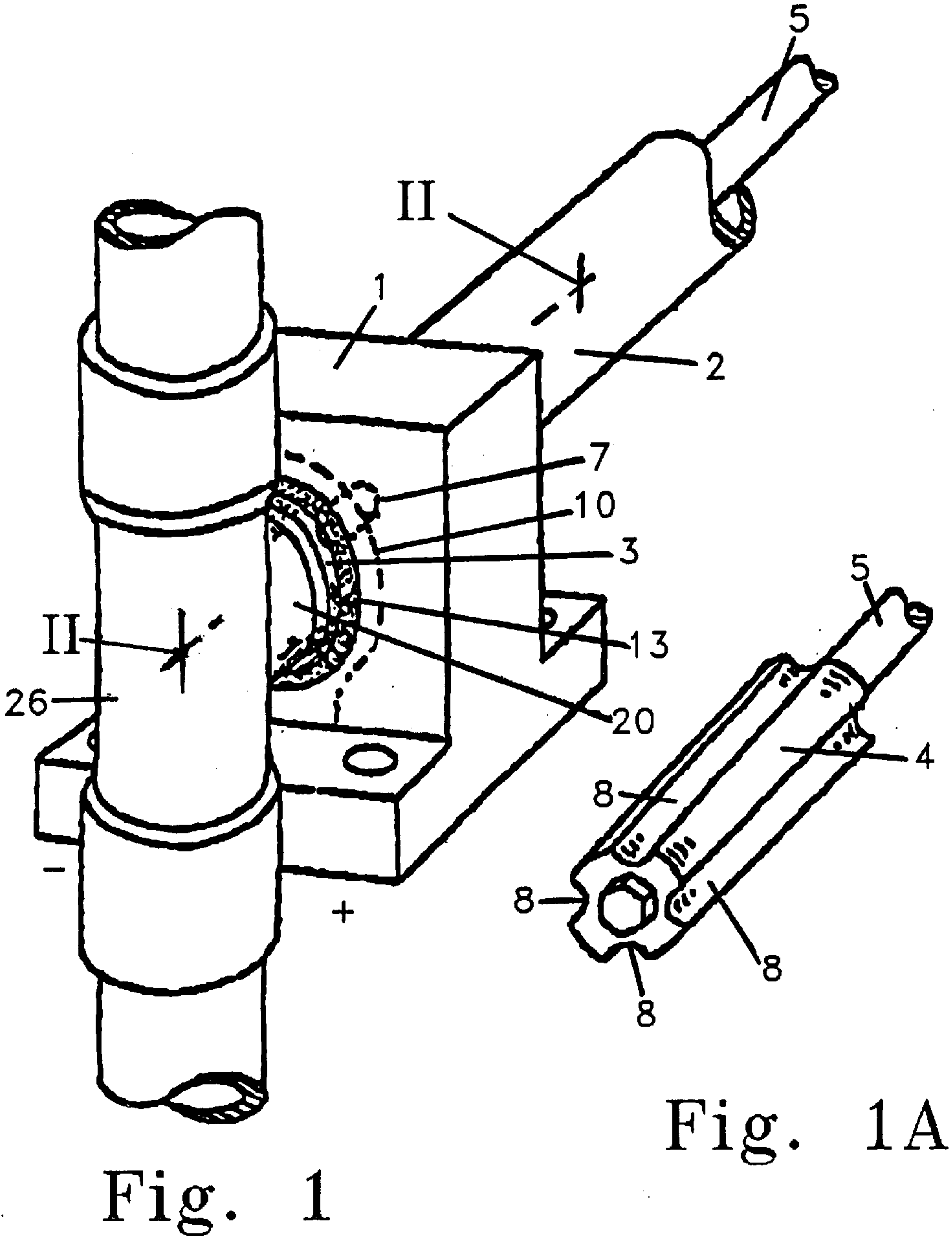
FIG. 1 is a magnetic field concentrator with a support core arranged for producing a connection between a pipe fitting and a tube with structural bulges at the connection.
FIG. 1A is a support core removed from the fitting and tube connection arranged in the field concentrator of FIG. 1 illustrating the magnetic impulse die forming surfaces.

The procedures presented by U.S. patent application No. 09/057,607 are used to produce metallic hollow bodies 2 with structural bulges by means of a magnetic impulse produced by a field concentrator 1 with an opening 3, that is connected as a high-current loop, with the desired structural bulge distortions 7 corresponding to a support core 4 which is removed or withdrawn. The support core is affixed to the end of a movable carrying bar 5 connected to a machine stand 6.

According to the teaching of this invention, two concentrically engaging hollow bodies, 2, 2*a*, namely a tube 2 and a fitting 2*a* of a tube-formed piece 2*b*, are conclusively and solidly connected together by several structural bulges 7 evenly distributed axially and circumferential over the extent of an overlapping joint. For example, three, four, five, six or more structural bulges 7 can be evenly distributed over the scope of the joint.

Figure 2:
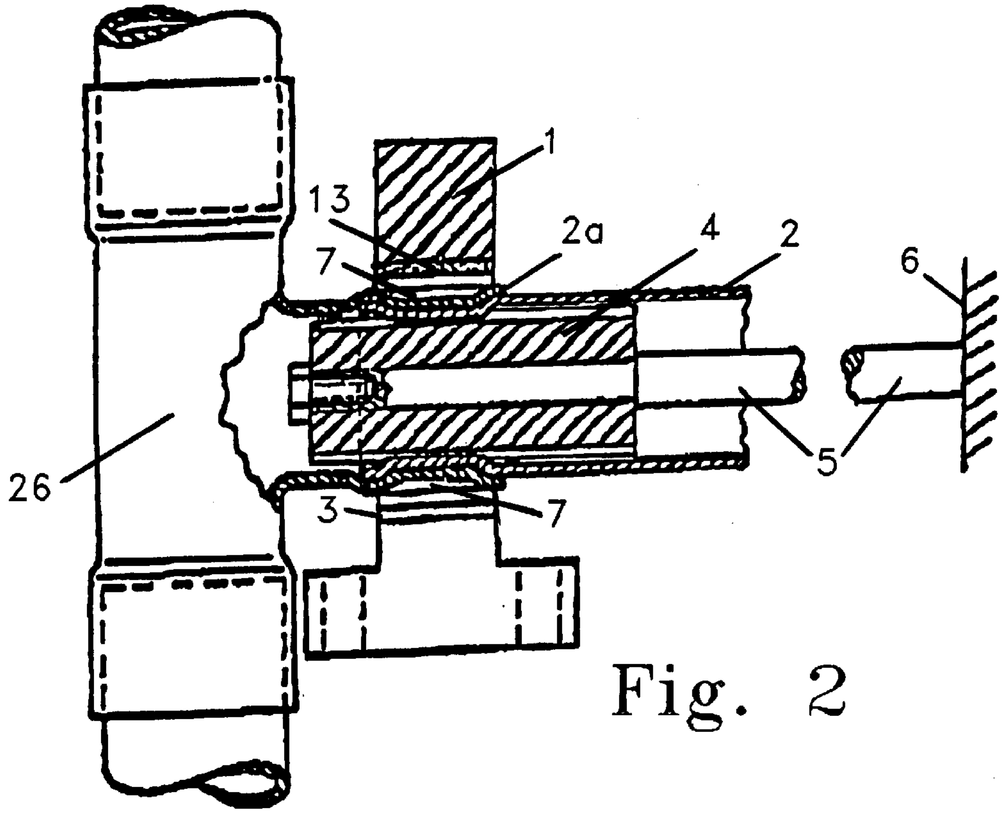
FIG. 2 is a longitudinal section through the field concentrator, support core and concentrically engaging ends of a fitting and tube connection taken along the plane intersecting II—II of FIG. 1, after generation of the structural bulges.
Figure 3:
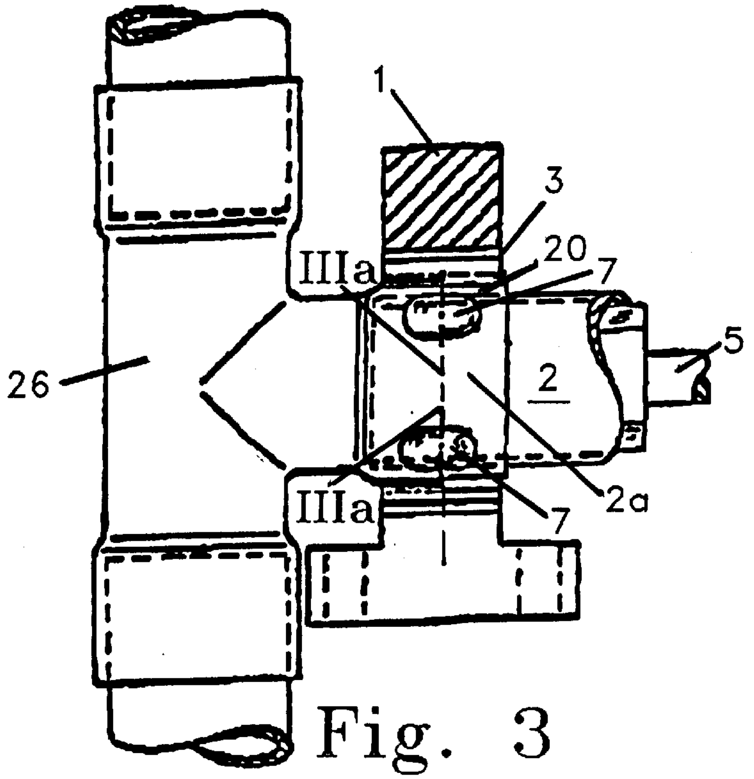
FIG. 3 is a view of the fitting and tube connection with the field concentrator cut away.
Figure 3A:
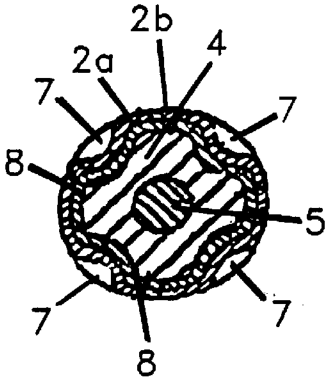
FIG. 3A is a sectional view through the completed pipe connection before the support core is removed, taken along the intersection IIIa—IIIa of FIG. 3.

As shown in FIGS. 1 through 3, a tube, 2, and a tube section, 2*a*, of a tube-formed piece, 2*b*, are connected together. In this embodiment, at least the outer body, 2*a*, of the hollow bodies or tubes 2, 2*a* are fabricated from a good electrically conducting material, such as Cu, Al or steel alloy.

However, the distortion process can also be produced as indicated in FIG. 3 by placing a driver ring 20 fabricated from an electrically good conducting material, such as Cu, Al or steel alloy on the outer hollow body or tube 2*a*. This is useful if the outer tube is not a good conductor or when sufficient distortion is not produced by the magnetic impulse without the additional driver ring 20 because of the tube composition.

The driver ring 20 can either remain on the hollow body or tube connection after the distortion process or be removed.

It can be especially advantageous in removing the driver ring 20 after the distortion process if it is expanded by reversing the magnetic impulse with a circuit as described in U.S. Pat. No. 5,813,264.

The magnetic impulse for the distortion process can be a condenser discharge over a current path 10 through the impulse transformer and field concentrator as described in U.S. Pat. No. 5,684,341 and U.S. Pat. No. 5,586,460 Al and it is especially advantageous if the current is generate according to U.S. Pat. No. 5,813,254.

However, the magnetic impulse can also be generated with a field concentrator incorporated directly into a field coil as in German Patent DE 23 30 479.

The appropriate apparatus for accomplishing the inventive procedure is designed so that the support 4 core 4 is arranged in the opening 3 of the field concentrator 1 to shape the overlapped tubes. The support core has a cross section which may be rounded or have a more angular profile. It has several throats or grooves 8 in the longitudinal direction as shown in the surface profile and the throats or grooves 8 have a conical profile to facilitate extraction of the support core from the hollow body or tube connection.

The inner surface area of the opening 3 in the field concentrator 1 is covered with electrical insulation 13 in order to avoid a short circuit through the workpiece to be distorted. If the parts have an electrical insulating coating, the insulation in the opening of the field concentrator 1 is not needed.

The process of accomplishing the method of the invention includes the step-by-step procedures of: 1) assembling the metallic hollow bodies or tube ends to be joined (work pieces) within a magneforming opening 3 within the magnetic field concentrator 1. The work pieces my be telescoped together before insertion into the opening 3 or after. 2) If required by the composition of the work pieces, placing a driver ring around the work pieces in the area to be deformed and inside the opening 3. 3) Placing a support core within the overlapping sections of the work pieces. 4) energizing a high-current loop to create a magnetic impulse in the magnetic field concentrator and thereby distort the work pieces in a pattern corresponding to the profile of the support core and thereby create a connecting joint between the work pieces. 5) Removing the support core and magnetic field concentrator from the work pieces.

If the proceeding process includes placing a driver ring about the work pieces, it may be removed, if desired, before or after removing the support core or driver ring. Removal of the driver ring may be aided by energizing the high-current loop in the reverse direction of that used in the deformation process after the deformation step and before the magnetic field concentrator is removed.

While preferred embodiments of this invention have been illustrated and described, variations and modifications may be apparent to those skilled in the art. Therefore, I do not wish to be limited thereto and ask that the scope and breadth of this invention be determined from the claims which follow rather than the above description.

What is claimed is:

1. A method for joining hollow bodies by means of a magnetic impulse produced by a high-current loop and magnetic field concentrator which produce structural bulge distortions corresponding to a support core surface, including the steps of:

assembling said hollow bodies to be joined in said magnetic field concentrator with a driver ring fabricated from an electrically good conducting material placed around the outer one of said hollow bodies and said support core so that overlapping sections of said hollow bodies are positioned within an opening of said magnetic field concentrator and said support core is within said hollow bodies to be joined and located in the overlapping sections thereof within said opening in said magnetic field concentrator;

energizing said high-current loop to create a magnetic impulse in said magnetic field concentrator and thereby simultaneously distorting said hollow bodies in a pattern corresponding to the profile of said support core and thereby create a connecting joint between said hollow bodies; and removing said support core and said magnetic field concentrator from said hollow bodies.

2. A method as defined by claim 1 wherein at least one of said hollow bodies is metallic.

3. A method as defined by claim 2, wherein said high-current loop is a field coil configured as said magnetic field concentrator.

4. A method as defined by claim 2, wherein at least the outer body of said hollow bodies is formed from an electrically conducting material.

5. A method as defined by claim 4, wherein said high-current loop is a field coil configured as said magnetic field concentrator.

6. A method as defined by claim 4, wherein said electrically conducting material is selected from a group of materials including copper, aluminium and steel alloy.

7. A method as defined by claim 6, wherein said high-current loop is a field coil configured as said magnetic field concentrator.

8. A method as defined by claim 1 wherein said hollow bodies are tubes telescoped together.

9. A method as defined by claim 8, wherein said high-current loop is a field coil configured as said magnetic field concentrator.

10. A method as defined by claim 1, including the further step of removing said driver ring from said hollow bodies after they are joined by distortion.

11. A method as defined by claim 10, wherein said high-current loop is a field coil configured as said magnetic field concentrator.

12. A method as defined by claim 1, including the further steps of:

energizing said high-current loop in a direction reverse to said prior energizing step to create a reverse magnetic impulse in said magnetic field concentrator and thereby expand said driver ring after said distortion process; and removing said driver ring from said connecting joint of said hollow bodies.

13. A method as defined by claim 12, wherein said high-current loop is a field coil configured as said magnetic field concentrator.

14. A method as defined by claim 1, including the step of generating a current flow for energizing said high-current loop by discharging a condenser through an impulse transformer.

15. A method as defined by claim 1, wherein said high-current loop is a field coil configured as said magnetic field concentrator.

16. A method as defined by claim 14, wherein said high-current loop is a field coil configured as said magnetic field concentrator.

17. An apparatus, comprising:

a high-current loop;

a magnetic field concentrator including a work piece receiving opening for receiving metallic hollow bodies to be joined by distortion;

a driver ring fabricated from an electrically good conducting material positioned between the work piece and said magnetic field concentrator; and a support core having a surface profile defining the geometry of structural bulges to be created as joining means for assembled work pieces within said work piece receiving opening.

18. An apparatus as defined by claim 17 wherein said support core has a conical profile to allow its extraction from said work pieces.

19. An apparatus as defined by claim 17 wherein said surface profile includes longitudinal groves.

20. An apparatus as defined by claim 19 wherein said support core has a cylindrical cross-section and a conical profile to allow its extraction from said work pieces.

* * * * *